(12) United States Patent
Lawrence et al.

(10) Patent No.: US 9,523,763 B2
(45) Date of Patent: Dec. 20, 2016

(54) SATELLITE-BASED INTEGER CYCLE AMBIGUITY RESOLUTION OF LOCAL MEDIUM WAVE RADIO SIGNALS

(71) Applicant: The Boeing Company, Chicago, IL (US)

(72) Inventors: David G. Lawrence, Santa Clara, CA (US); David A. Whelan, Newport Coast, CA (US); Gregory M. Gutt, Ashburn, VA (US); Michael L. O'Connor, Redwood City, CA (US)

(73) Assignee: The Boeing Company, Chicago, IL (US)

( * ) Notice: Subject to any disclaimer, the term of this patent is extended or adjusted under 35 U.S.C. 154(b) by 736 days.

(21) Appl. No.: 13/783,304

(22) Filed: Mar. 3, 2013

(65) Prior Publication Data

US 2014/0247183 A1 Sep. 4, 2014

(51) Int. Cl.
*G01S 19/44* (2010.01)
*G01S 5/14* (2006.01)
*G01S 19/48* (2010.01)

(52) U.S. Cl.
CPC . *G01S 5/14* (2013.01); *G01S 19/48* (2013.01)

(58) Field of Classification Search
CPC .................................. G01S 5/14; G01S 19/48
USPC ..................................................... 342/357.27
See application file for complete search history.

(56) References Cited

U.S. PATENT DOCUMENTS

| | | | | |
|---|---|---|---|---|
| 5,579,348 A | * | 11/1996 | Walker | ...................... H03L 7/06 375/355 |
| 5,774,829 A | | 6/1998 | Cisneros et al. | |
| 2010/0085248 A1 | * | 4/2010 | Ferguson | ................ G01S 19/04 342/357.41 |
| 2011/0140959 A1 | * | 6/2011 | Vollath | .................... G01S 19/44 342/357.27 |

FOREIGN PATENT DOCUMENTS

WO 94/15412 A1 7/1994

OTHER PUBLICATIONS

Form PCT/IB/373, International Preliminary Report on Patentability dated Sep. 8, 2015.
(Continued)

*Primary Examiner* — Frank J McGue
(74) *Attorney, Agent, or Firm* — McDonnell Boehnen Hulbert & Berghoff LLP

(57) ABSTRACT

A system and methods for resolving integer cycle ambiguity in medium wave carrier radio signals are presented. A satellite signal is received at a receiving location and a measured code phase of the satellite signal is measured. A satellite location estimate of the receiving location is computed based on the measured code phase. Medium wave radio carrier signals from medium wave radio transmitters are received at the receiving location. A number of wavelengths of the medium wave radio carrier signals from the satellite location estimate to each of the medium wave radio transmitters is determined respectively. A carrier phase of each of the medium wave radio carrier signals is measured. An improved position estimate of the receiving location is computed based on the number of wavelengths and the carrier phase of each of the medium wave radio carrier signals, and a location of each of the medium wave radio transmitters.

20 Claims, 6 Drawing Sheets

(56) References Cited

OTHER PUBLICATIONS

Donghyun Kim and Richard B. Langley, "GPS Ambiguity Resolution and Validation: Methodologies, Trends and Issues", GPS Research Group, Geodetic Research Laboratory, Department of Geodesy and Geomatics Engineering, University of New Brunswick, Fredericton, N.B. E3B 5A3, Canada. Presented at the 7th GNSS Workshop—International Symposium on GPS/GNSS, Seoul, Korea, Nov. 30-Dec. 2, 2000.

Ronald J. Palmer, "Precise Positioning with AM Radio Stations", A Thesis Submitted to the Faculty of Graduate Studies in Partial Fulfillment of the Requirement for the degree of Doctor of Philosophy, Department of Electrical and Computer Engineering University of Manitoba. Winnipeg, Manitoba R3T 2N2, Sep. 1997.

PCT/US2014/015510—International Search Report and Written Opinion dated May 9, 2014 filed on the basis of the subject U.S. pending application.

* cited by examiner

SATELLITE-BASED INTEGER CYCLE AMBIGUITY RESOLUTION OF LOCAL MEDIUM WAVE RADIO SIGNALS

FIELD

Embodiments of the present disclosure relate generally to location determination. More particularly, embodiments of the present disclosure relate to systems for integer cycle ambiguity resolution in location determination.

BACKGROUND

Determining an unknown integer number of carrier waves (N) between a transmitter and a receiver is generally referred to as integer cycle ambiguity resolution. The integer number of carrier waves (N) allows estimating a range between a location of the transmitter and a location of a receiver. When carrier phase tracking is applied to Global Navigation Satellite System (GNSS)-based radio-navigation, a variety of existing techniques may be used for integer cycle ambiguity resolution. Since Amplitude Modulated (AM) radio stations typically transmit one frequency, are generally stationary, and generally don't broadcast a code-phase signal, these techniques do not work for integer cycle ambiguity resolution of AM radio station signals. Other existing techniques use AM radio for navigation by manually initializing integer cycle ambiguities by starting at a known location, or using multiple frequencies to resolve integer cycle ambiguities.

SUMMARY

A system and methods for resolving integer cycle ambiguity in medium wave radio signals are presented. A satellite signal is received at a receiving location and a measured code phase of the satellite signal is measured. A satellite location estimate of the receiving location is computed based on the measured code phase. Medium wave radio carrier signals from a plurality of medium wave radio transmitters are received with a medium wave radio receiver the receiving location. A number of wavelengths of the medium wave radio carrier signals from the satellite location estimate to each of the medium wave radio transmitters is determined respectively. A carrier phase of each of the medium wave radio carrier signals is measured with the medium wave radio receiver. An improved position estimate of the receiving location is computed based on the number of wavelengths and the carrier phase of each of the medium wave radio carrier signals, and a transmitter location of each of the medium wave radio transmitters.

In this manner, embodiments of the disclosure provide systems and methods for resolving integer cycle ambiguities for one or more medium wave radio carrier signals transmitted from medium wave radio transmitters using satellite-based positioning.

In an embodiment, a system for resolving integer cycle ambiguity in medium wave radio signals comprises a satellite receiver, a medium wave radio receiver, and a processor module. The satellite receiver receives at least one satellite signal at a receiving location, and measures a measured code phase of the satellite signal. The medium wave radio receiver receives medium wave radio carrier signals from medium wave radio transmitters at the receiving location, and measures a carrier phase of each the medium wave radio carrier signals. The processor module further computes a satellite location estimate of the receiving location based on the measured code phase, and determines a number of wavelengths of the medium wave radio carrier signals from the satellite location estimate to each of the medium wave radio transmitters respectively. The processor module also computes an improved position estimate of the receiving location based on the number of wavelengths and the carrier phase of each of the medium wave radio carrier signals, and a transmitter location of each of the medium wave radio transmitters.

In another embodiment, a method for resolving integer cycle ambiguity in medium wave radio signals receives a satellite signal at a satellite receiver at a receiving location. The method further measures a measured code phase of the satellite signal at the satellite receiver, and computes a satellite location estimate of the receiving location based on the measured code phase using a processor. The method further receives a plurality of medium wave radio carrier signals from a plurality of medium wave radio transmitters with at least one medium wave radio receiver at the receiving location. The method further determines a number of wavelengths of the medium wave radio carrier signals from the satellite location estimate to each of the medium wave radio transmitters respectively using the processor. The method further measures a carrier phase of each the medium wave radio carrier signals with the at least one medium wave radio receiver. The method further computes an improved position estimate of the receiving location based on the number of wavelengths and the carrier phase of each of the medium wave radio carrier signals, and a location of each of the medium wave radio transmitters using the processor.

In a further embodiment, a non-transitory computer readable storage medium comprises computer-executable instructions for resolving integer cycle ambiguities in medium wave radio signals. The computer-executable instructions receive a satellite signal at a satellite receiver at a receiving location, and measure a measured code phase of the satellite signal at the satellite receiver. The computer-executable instructions further compute a satellite location estimate of the receiving location based on the measured code phase using a processor module, and receive medium wave radio carrier signals from a plurality of medium wave radio transmitters with a medium wave radio receiver at the receiving location. The computer-executable instructions further determine a number of wavelengths of the medium wave radio carrier signals from the satellite location estimate to each of the medium wave radio transmitters respectively, and measure a carrier phase of each the medium wave radio carrier signals with the medium wave radio receiver. The computer-executable instructions further compute an improved position estimate of the receiving location based on the number of wavelengths and the carrier phase of each of the medium wave radio carrier signals, and a transmitter location of each of the medium wave radio transmitters.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the

3 disclosure without limiting the breadth, scope, scale, or applicability of the disclosure. The drawings are not necessarily made to scale.

Figure 1:
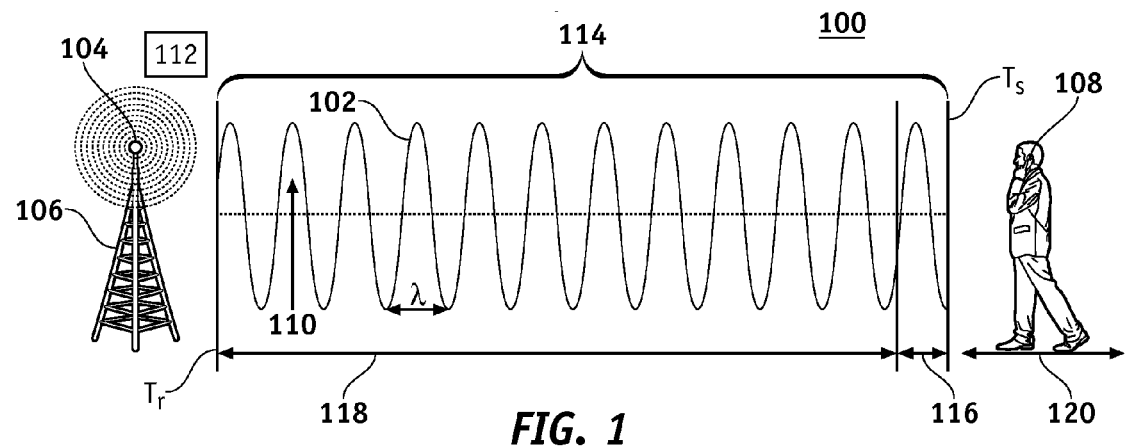

FIG. 1 is an illustration of an AM radio carrier signal showing integer components (N) (integer number of carrier waves N) relative to a timing reference.

Figure 2:
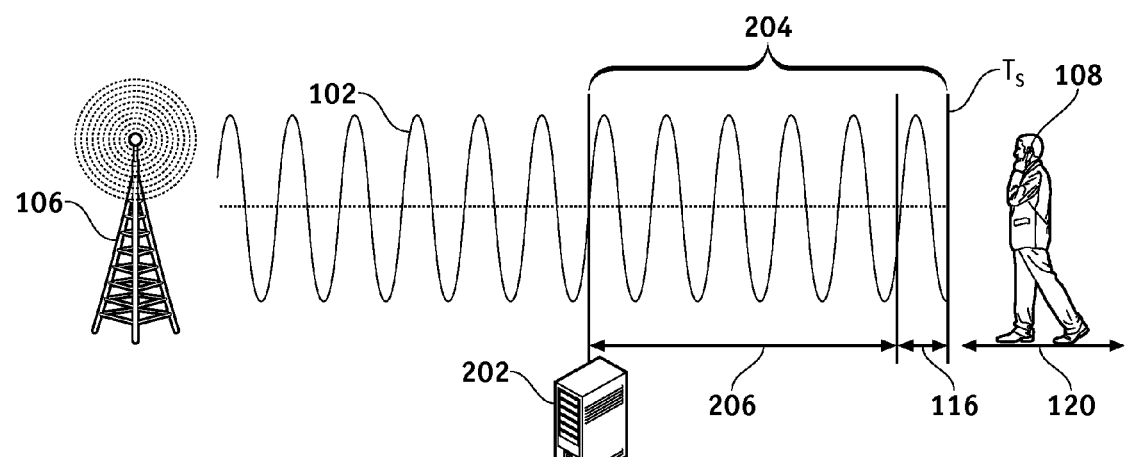

FIG. 2 is an illustration of an AM radio carrier signal showing integer components (N) (integer number of carrier waves N) relative to a differential reference station.

Figure 3:
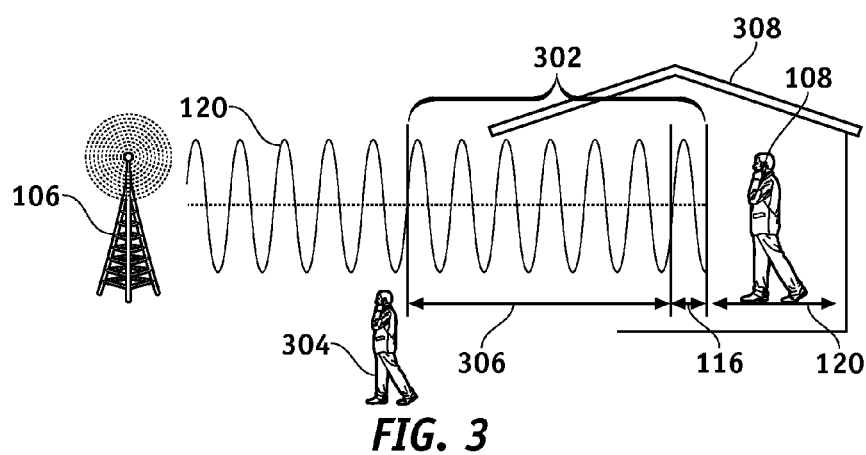

FIG. 3 is an illustration of an AM radio carrier signal showing integer components (N) (integer number of carrier waves N) relative to a mobile receiver.

Figure 4:
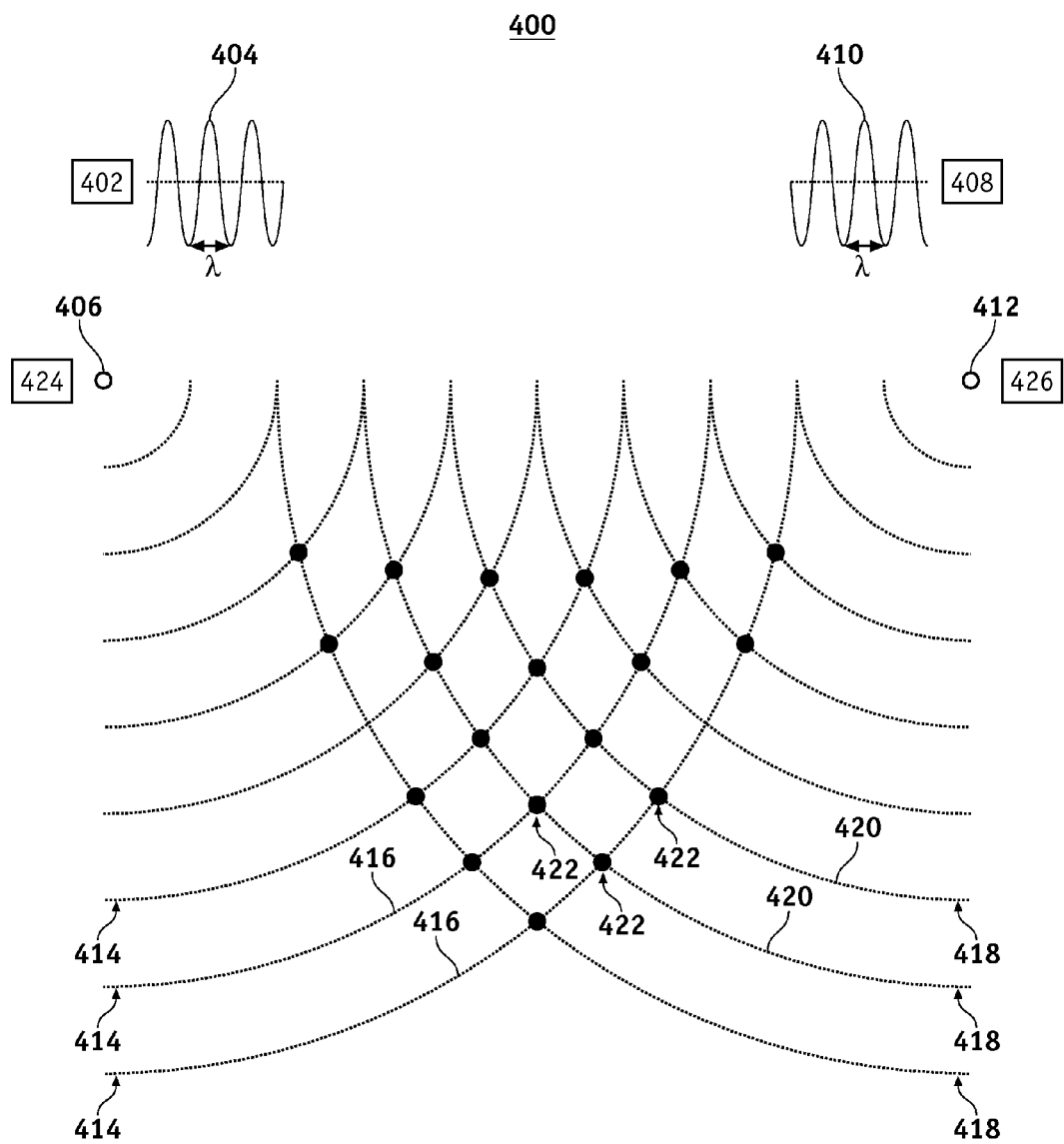

FIG. 4 is an illustration of an exemplary two-dimensional graph showing an issue of integer cycle ambiguity resolution of AM radio transmitters.

Figure 5:
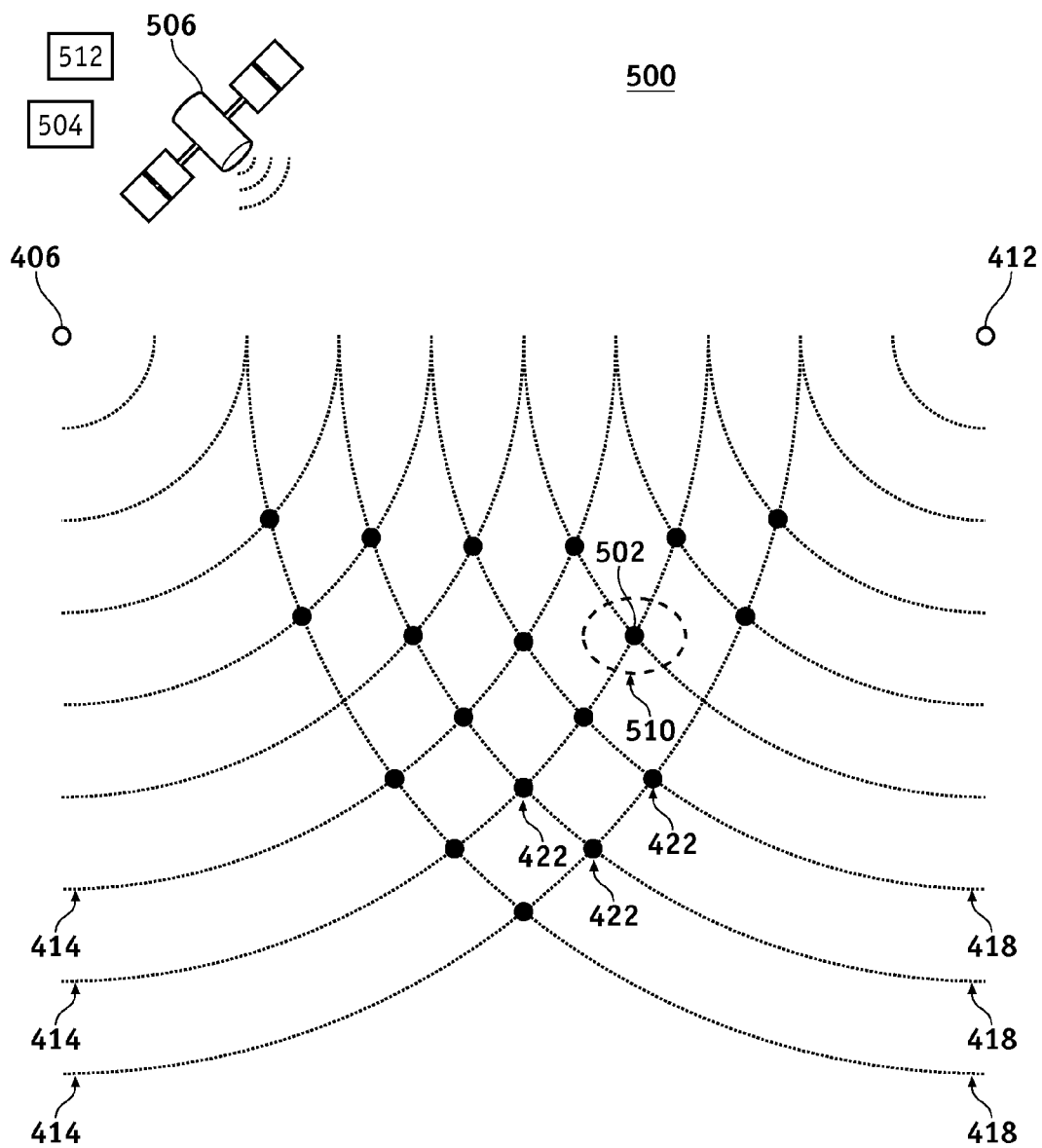

FIG. 5 is an illustration is an illustration of an exemplary two-dimensional graph showing an issue of integer cycle ambiguity resolution of AM radio stations shown in FIG. 4 plus a satellite-based-solution according to an embodiment of the disclosure.

Figure 6:
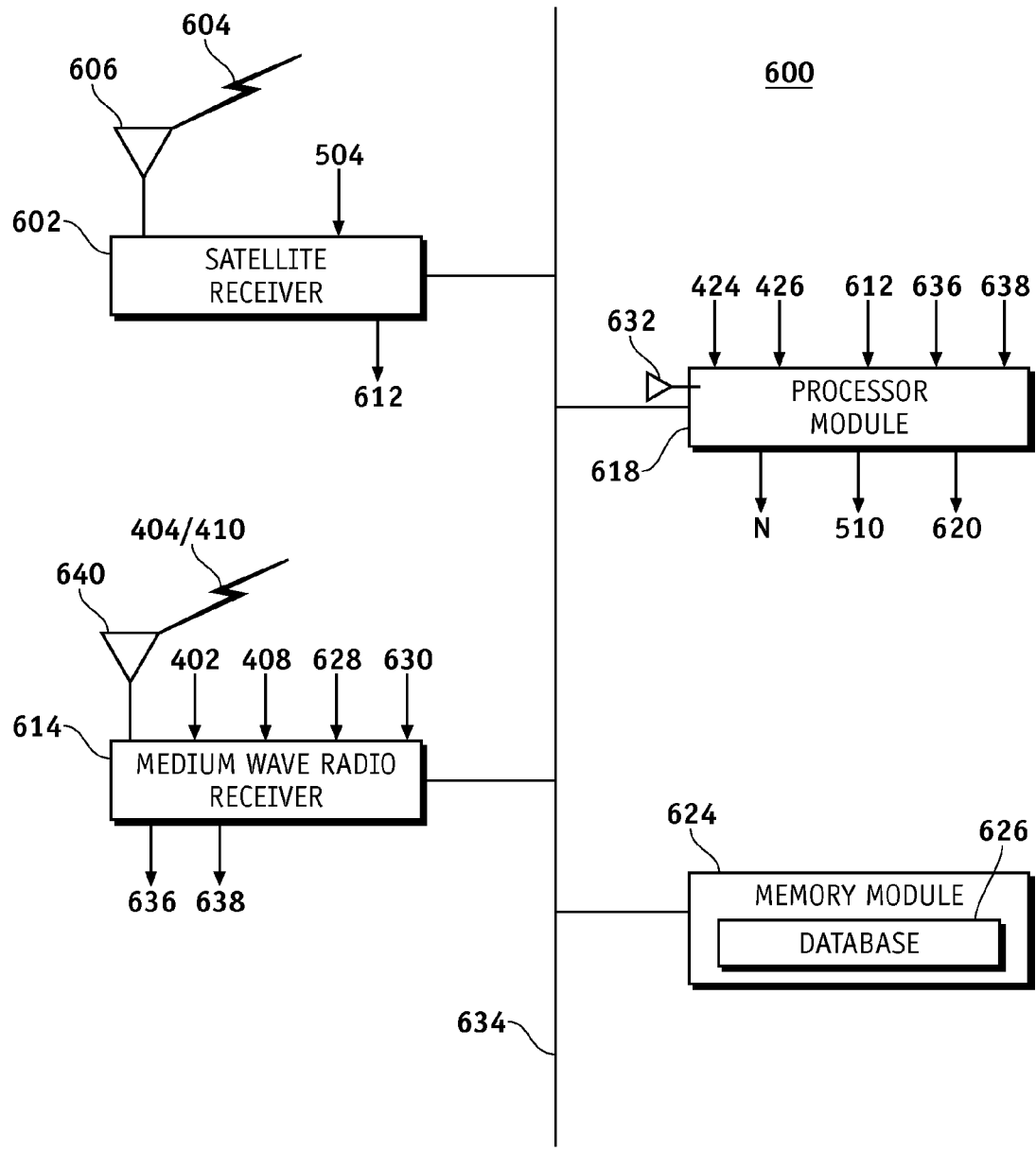

FIG. 6 is an illustration of a functional block diagram of an integer cycle ambiguity resolution system according to an embodiment of the disclosure.

Figure 7:
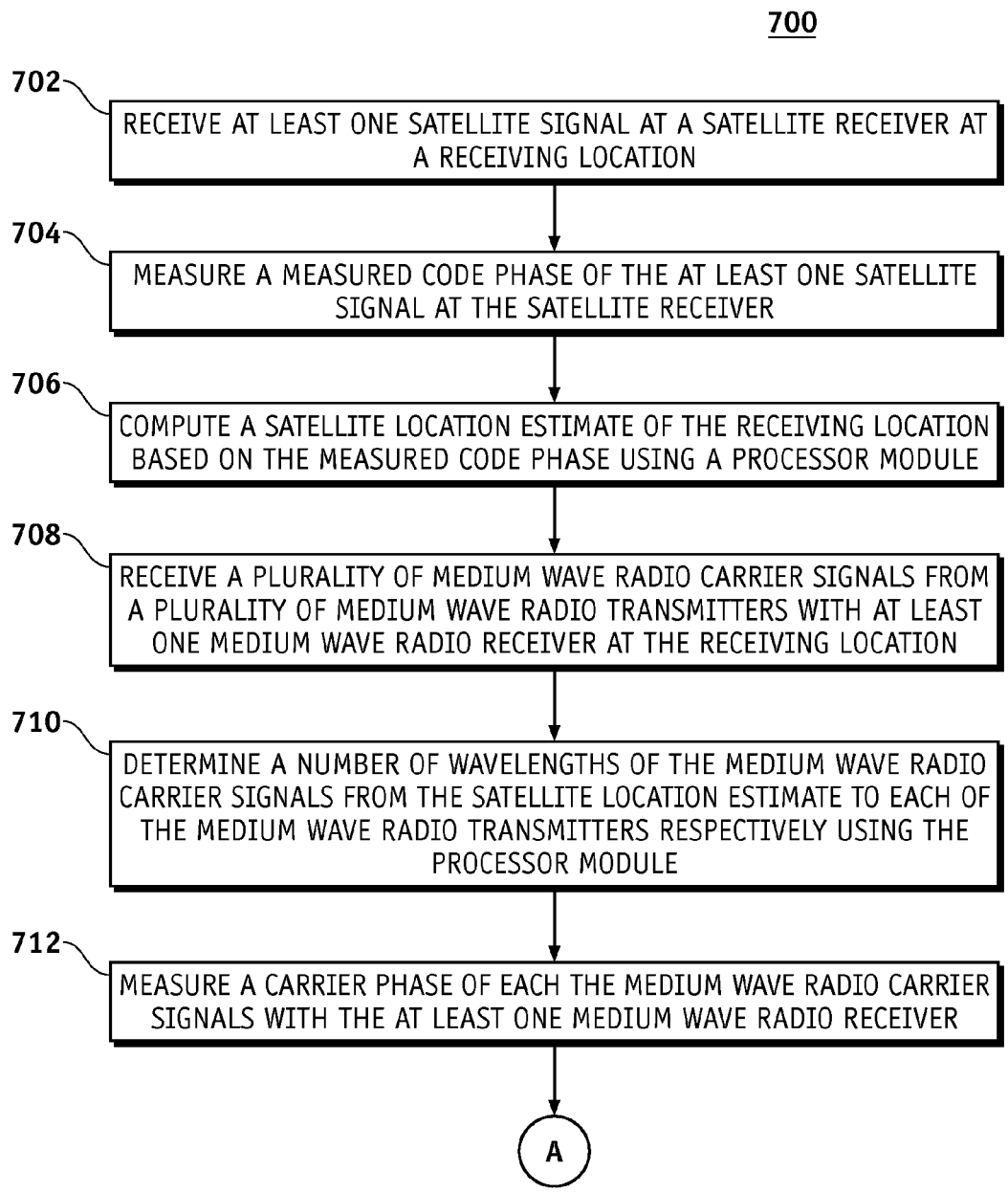
Figure 7:
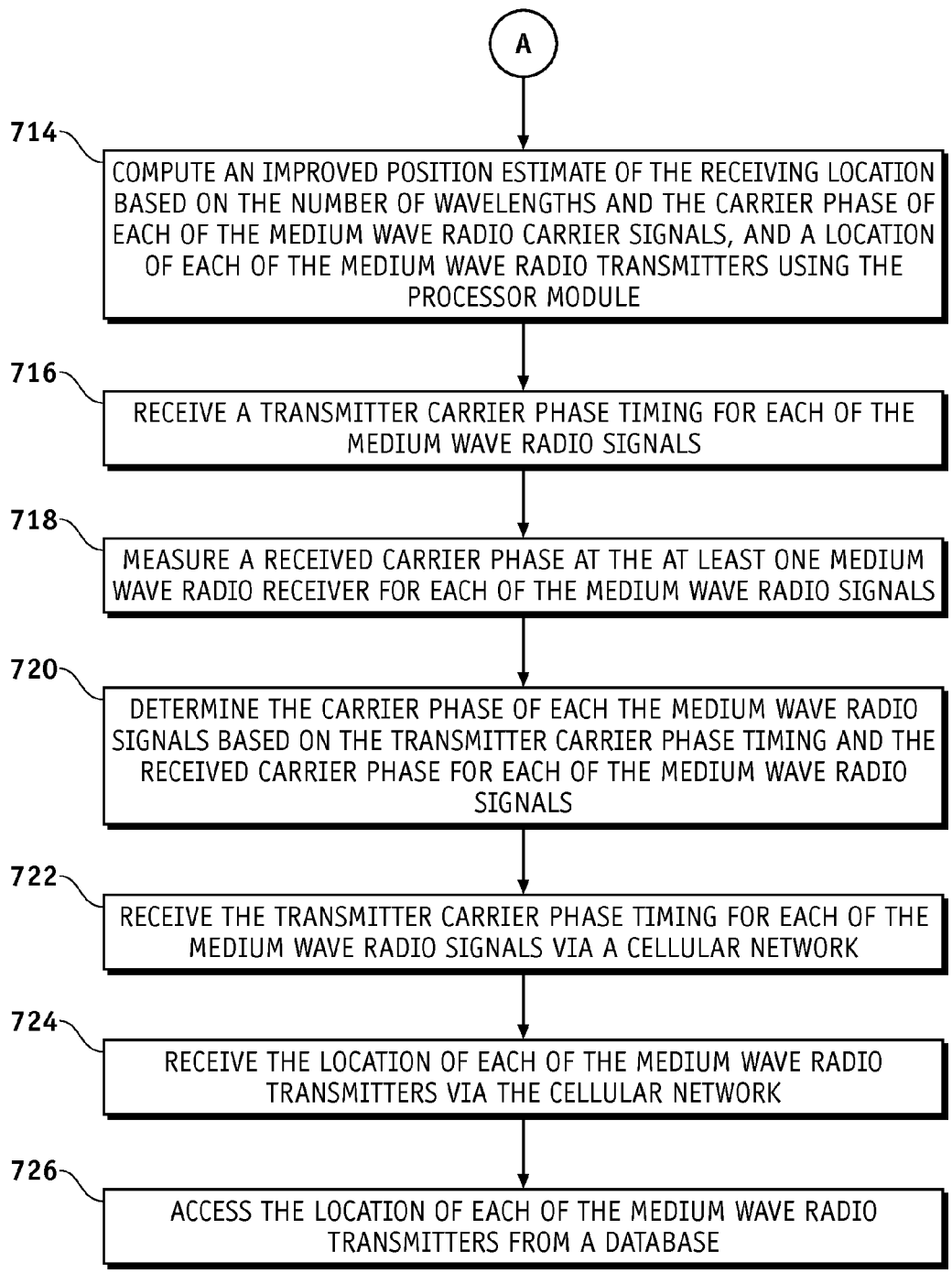

FIG. 7 is an illustration of an exemplary flowchart showing a process for resolving an integer cycle ambiguity according to an embodiment of the disclosure.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to code-phase tracking, carrier-phase tracking, communication systems, network protocols, global positioning systems, cloud computing, and other functional aspects of the systems (and the individual operating components of the systems) may not be described in detail herein.

Embodiments of the disclosure are described in the context of a non-limiting application, namely, a mobile phone. Embodiments of the disclosure, however, are not limited to such mobile phone, and the techniques described herein may also be utilized in other applications requiring finding a location. For example, embodiments may be applicable to a desktop computer, a laptop or notebook computer, an iPad™, an iPod™, a cell phone, a personal digital assistant (PDA), a mainframe, a server, a router, an internet protocol (IP) node, iTouch, a Wi-Fi node, a client device, or any other type of special or general purpose computing device as may be desirable or appropriate for a given application or environment.

As would be apparent to one of ordinary skill in the art after reading this description, the following are examples and embodiments of the disclosure, are not limited to operating in accordance with these examples. Other embodiments may be utilized and changes may be made without departing from the scope of the exemplary embodiments of the present disclosure.

As is true for many radio frequency signals, an AM radio signal can be used as a ranging source for radio-navigation. An AM radio signal has an advantage in that the AM radio signal can be received indoors with high quality, and AM radio signals are also common throughout the world. An AM radio signal does not have a distinct digital component that can be used for code-phase tracking. However, an AM radio signal does have a clean AM carrier signal that can be used for carrier-phase tracking.

An important factor of carrier-phase-tracking-based radio-navigation is that integer cycle ambiguity resolution is required. Embodiments of the disclosure provide a system and methods for resolving integer cycle ambiguities for one or more Amplitude Modulated (AM) radio carrier signals using satellite-based positioning. The AM radio carrier signals are transmitted from AM radio transmitters, and may comprise, for example, an integer number of carrier wavelengths N between an AM radio transmitter and a receiver. A mobile user can measure their phase along the AM radio carrier signal at an instant in time as explained below.

While embodiments shown in the figures may use AM radio carrier signals as examples, any substantially medium wave or medium frequency signals using any suitable modulation method may be used. In other embodiments, any signal comprising ambiguities resolvable with an unambiguous approximately 100 meter level position estimate may be used.

FIG. 1 is an illustration of an AM radio carrier signal 102 showing integer components (N) 118 (integer number of carrier wavelengths N) relative to a timing reference $T_r$. The AM radio carrier signal 102 transmitted from an antenna 104 may be synchronized to time from the Global Positioning System (GPS) or other timing reference. This timing synchronization may be done, for example, by using a pulse-per-second (PPS) output from a GPS timing receiver at the timing reference $T_r$ for an AM radio transmitter 106 that generates the AM radio carrier signal 102.

Since the AM radio carrier signal 102 is synchronized to the timing reference $T_r$ at a signal source such as the AM radio transmitter 106, when a mobile device 108 (mobile user) samples/measures a phase 110 of the AM radio carrier signal 102 at a time $T_s$, a substantially simultaneous phase 112 of the AM radio carrier signal 102 at the AM radio transmitter 106 is also know or can be determined.

A distance 114 between the mobile device 108 and the AM radio transmitter 106 is then equal to a difference in fractional carrier phase (P) 116 measured by the mobile device 108, plus an unknown integer number of carrier waves (N) 118 (integer components (N) 118) which cannot be directly measured by the mobile device 108. A process of computing the unknown integer number of carrier waves (N) 118 is called integer cycle ambiguity resolution.

FIG. 2 is an illustration of the AM radio carrier signal 102 showing integer components (N) 206 (integer number of carrier waves (N) 206) relative to a differential reference station 202. The phase 110 along the AM radio carrier signal 102 is measured/sampled substantially simultaneously by a receiver in a known and fixed location such as the differential reference station 202 and by the mobile device 108. The distance 204 between the mobile device 108 and the differential reference station 202 is equal to the difference in fractional carrier phase (P) 116 measured by the mobile device 108, plus an unknown integer number of carrier waves (N) 206 (integer components (N) 206) which cannot be directly measured by the mobile device 108.

In the embodiment shown in FIG. 2, one differential reference station is used. However, in other embodiments, any number of differential reference stations suitable for resolving the integer cycle ambiguity may be used. As mentioned above, a process of computing the unknown integer number of carrier waves (N) 206 is called integer cycle ambiguity resolution.

FIG. 3 is an illustration of the AM radio carrier signal 102 showing an integer components (N) 306 (integer number of carrier waves (N) 306) relative to a mobile reference receiver 304. In this example ("crowd sourcing"), a system and method similar to the embodiment shown in FIG. 2 is used; however, one or more differential reference stations 202 in FIG. 2 are replaced by mobile reference receivers 304. The mobile reference receivers 304 are mobile devices other than the mobile device 108. The mobile reference receivers 304 are located in known locations, for example, outdoors and their locations can be measured by GPS/GNSS.

Measurements from the mobile reference receivers 304 are transmitted to a processor such as a processor module 618 in FIG. 6 where they can be compared to measurement(s) collected substantially simultaneously by the mobile device 108 in order to determine the receiving location 120 of the mobile device 108. The processor may be located in the mobile device 108, or other locations remote from the mobile device 108. Similar to FIG. 2, a distance 302 between the mobile device 108 and the mobile reference receivers 304 is equal to the difference in fractional carrier phase (P) 116 (factional component (P) 116) measured by the mobile device 108, plus an unknown integer number of carrier waves (N) 306 (integer components (N) 306) which cannot be directly measured.

When carrier phase tracking is applied to GNSS-based radio-navigation, a variety of existing techniques may be used for integer cycle ambiguity resolution: (1) techniques that take advantage of multiple frequencies transmitted by the satellites; (2) techniques that rely on satellite motion to resolve the integer; and (3) techniques that use code-phase measurements to estimate a user's position (estimated user position), and then attempt to lock on to a correct set of integers that lie near the estimated user position. Many implementations may combine 2 or even all 3 of these techniques. Since AM radio stations typically transmit one frequency, are generally stationary, and generally don't broadcast a code-phase signal, these techniques do not work for integer cycle ambiguity resolution of the AM radio station signals.

Other existing techniques use AM radio for navigation by manually initializing integer cycle ambiguities by starting at a known location, or using multiple frequencies to resolve integer cycle ambiguities.

Embodiments of the disclosure provide a system and methods to resolve integer cycle ambiguities for one or more AM radio carrier signals transmitted from AM radio transmitters using satellite-based positioning.

FIG. 4 is an illustration of an exemplary two-dimensional graph 400 showing an issue of integer cycle ambiguity resolution of AM radio stations 406/412 (transmitters 406/412). A user such as the mobile device 108 at an unknown position such as the receiving location 120 makes a measurement of a carrier phase 402 (110 in FIG. 1) of an AM radio carrier signal 404 transmitted from a (first) AM radio transmitter 406, and a measurement of a carrier phase 408 of an AM radio carrier signal 410 transmitted from a (second) AM radio transmitter 412. In this example, a reference location for the AM radio carrier signal 404 and the AM radio carrier signal 410 are their respective signal sources such as the first AM radio transmitter 406 and the second AM radio transmitter 412. However, other reference locations, such as but without limitation, the differential reference station 202, and the mobile reference receiver 304, may also be used to measure the carrier phase 402, the carrier phase 408, and other signal characteristics of the AM radio carrier signals 404/410.

For each measurement of the carrier phase 402 and the carrier phase 408, only the factional component (P) 116 described in FIGS. 1-3 can be measured. The integer component (N) 118/206/306 in FIGS. 1-3 is known to be an integer component N (integer number N) of carrier wavelengths λ, but the integer component N is unknown. Therefore, a range ($r_1$) such as the distance 114 in FIG. 1 between the receiving location 120 (user) such as the mobile device 108 and the AM radio station 406 is based on the following relationship shown in equation (1):

$$r_1 = N_1 + P_1 \qquad (1),$$

where $P_1$ is the measurement of the carrier phase 402, and $N_1$ may be equal to 0, $\lambda_1$, $2\lambda_1$, $3\lambda_1$, $4\lambda_1$, ... M $\lambda_1$ where $\lambda_1$ is a carrier wavelength (similar to λ shown in FIGS. 1 and 4) of the AM radio carrier signal 404 transmitted from the AM radio station 406, and M is an integer equal to a maximum number of carrier wavelength $\lambda_1$ of the AM radio carrier signal 404. Equation (1) leads to a number of possible position solutions 414 comprising concentric circles 416 centered at the AM radio transmitter 406.

Similarly, a carrier measurement from AM radio transmitter 412 leads to a number of possible position solutions 418 comprising concentric circles 420 centered at the AM radio transmitter 412.

In this manner, the receiving location 120 (user position) can be narrowed down to locations where these concentric circles 416 and 420 overlap to generate potential navigation solutions 422. However, without knowing the integer cycle ambiguities (N), the mobile device 108 (user) cannot determine which of these potential navigation solutions 422 is a correct position of the receiving location 120.

Equation (1) above and FIG. 4 are simplifications for illustrative purposes and ignore an effect of a user receiver clock bias. Mathematical techniques in the art of satellite and radio navigation may be used to simultaneously solve for time and location in a context of integer cycle ambiguity resolution. Generally the navigation solution 502 (FIG. 5) estimates time as well as position. For example, in some cases two measurements may be differenced to eliminate receiver clock error or bias.

In some cases, a receiver clock in the mobile device 108 may comprise a higher accuracy than an accuracy of a horizontal position determined from a navigation solution 502 (FIG. 5). This can increase a complexity of computations over a concentric circle graphical representation.

FIG. 5 is an illustration of an exemplary two-dimensional graph 500 showing an integer cycle ambiguity resolution of the AM radio transmitters 406/412 shown in FIG. 4 plus the navigation solution 502 based on tracking/measuring a satellite code phase 504 and/or measuring a Doppler shift 512 of one or more satellites 506 according to an embodiment of the disclosure. The navigation solution 502 may be based on a standard GPS measurement, a measurement based on Iridium satellites, or a measurement based on tracking of a satellite code phase of other satellite. Iridium satellite signals are however generally better able to penetrate indoor environments than GPS signals to provide a viable position estimate such as the position estimate 510 (satellite location estimate 510) for an indoor 308 (FIG. 3) user of the mobile device 108. In this example, only one navigation solution 502 from among potential navigation solutions 422 lies within the satellite location estimate 510 from a measurement of the satellite code phase 504. Therefore, the integer cycle ambiguities (N) can be determined.

For some embodiments, calculating the satellite location estimate 510 is described in more detail in the U.S. Pat. Nos. 8,035,558, 7,952,518, and 8,296,051, and U.S. Patent Publication No. US 2010/0265128 contents of which are incorporated by reference herein in their entirety.

Non-optimalities (e.g., a time for a satellite to move) of satellite-based positioning systems can be removed by using the AM radio carrier signals, while strengths (e.g., widespread presence of satellites) of the satellite-based positioning systems are re-enforced allowing a more accurate estimate of a receiving location.

For example but without limitation, satellite signals such as Iridium-based satellite signals from an Iridium low orbit satellite network can be used along with the AM radio carrier signals to estimate the receiving location more accurately and in less time than the iridium-based satellite positioning system can provide by itself without using the AM radio carrier signals.

The integer cycle ambiguities, combined with a measurement of the carrier phase 402 of the AM radio carrier signal 404 transmitted from the AM radio transmitter 406, and the measurement of the carrier phase 408 of the AM radio carrier signal 410 transmitted from the AM radio transmitter 412 mentioned in FIG. 4 above, provide a more accurate position estimate than may be possible with only a satellite-based solution. The integer cycle ambiguity resolution method illustrated herein can be extended to three dimensions (3-D) without loss of generality, although for AM transmitters mostly horizontal information may be provided.

If a satellite-based position estimate comprises more than one navigation solution such as the navigation solution 502, measurement of the carrier phase 402/408 from one or more additional AM radio stations such as the AM radio transmitter 406/412 can be made. A standard measurement residual can then be computed for each navigation solution within the number of the satellite-based position estimate. These residuals can then be compared to find the correct solution (e.g., one with a lowest measurement residual) comprising the receiving location 120.

Using a graphical concentric circle as an example, when three transmitters are used, a set of concentric circles may not exactly intersect at a single point. A low residual solution may be one where a misalignment of intersections of the set of concentric circles is at a substantial minimum.

In one embodiment, the AM radio transmitters 406 and 412 comprise U.S. AM radio stations in a frequency range of 520 kHz-1,610 kHz. The range of carrier wavelengths $\lambda$ in this frequency range is approximately 200 to 600 meters. Iridium-based code-phase measurements are able to measure a user position such as the receiving location 120 to better than about 100 meters (about 328 feet) accuracy in many indoor environments. Since this is better than half of the carrier wavelength $\lambda$ of typical AM radio station signals, Iridium-based code phase measurements are a good solution for integer cycle ambiguity resolution.

For a carrier phase measurement that is approximately 1% of the carrier wavelength $\lambda$, a ranging error to an AM radio station would be approximately 2 to 6 meters once the integer cycle ambiguities (N) are resolved. Assuming a dilution of precision is reasonable based on a geometry of a line-of-sight vectors to the AM radio stations, then a resulting carrier phase navigation solution is significantly more accurate than a solution based on satellite code-phase measurements.

FIG. 6 is an illustration of a functional block diagram of an integer cycle ambiguity resolution system 600 (system 600) according to an embodiment of the disclosure. System 600 may comprise a satellite receiver 602, a medium wave radio receiver 614, the processor module 618, and a memory module 624.

The satellite receiver 602 is configured to receive at least one satellite signal 604 at an antenna 606 of the satellite receiver 602 at a receiving location 120 of the mobile device 108 (in FIG. 1) and measure a measured code phase 612 of the satellite code phase 504 of the at least one satellite signal 604. The satellite receiver 602 may receive the at least one satellite signal 604 from, an Iridium satellite, a GNSS satellite, and/or other satellite. Thus, the satellite receiver 602 may comprise an Iridium satellite-based receiver configured to receive an Iridium satellite-based signal, a GNSS satellite receiver configured to receive a GNSS signal, or a combination thereof.

The GNSS satellite may comprise: a low Earth orbiting (LEO) satellite, a medium Earth orbiting (MEO) satellite, a geosynchronous Earth orbiting (GEO) satellite, a Global Positioning System (GPS™) satellite, a Globalnaya Navigatsionnaya Sputnikovaya Sistema (GLONASS™) satellite, a BeiDou Navigation System (COMPASS™) satellite, a Galileo™ satellite, and/or other satellite. The satellite receiver 602 may also receive the satellite signal 604 form a future constellation.

The medium wave radio receiver 614 is configured to receive a plurality of medium wave signals such as the AM radio carrier signals 404/410 from a plurality of AM radio transmitters 406/412 respectively at the receiving location 120 via an antenna 640. The medium wave radio receiver 614 is also configured to measure a measured carrier phase 636/638 of the (received) carrier phase 402/408 of each of the AM radio carrier signals 404/410 respectively. The medium wave signals may comprise, for example but without limitation, the AM radio carrier signals 404/410, frequency modulated (FM) carrier signals, phase modulated (PM) carrier signals, or other substantially medium wave or medium frequency signals using any suitable modulation method.

The measured carrier phase 636/638 of each of the AM radio carrier signals 404/410 may be determined based on a transmitter carrier phase timing 628/630 and the received carrier phase 402/408 for each of the AM radio carrier signals 404/410. The transmitter carrier phase timing 628/630 for each of the AM radio carrier signals 404/410 may be received at the medium wave (e.g., AM) radio receiver 614 and the received carrier phase 402/408 for each of the AM radio signals may be measured at the medium wave radio receiver 614 to provide the measured carrier phase 636/638. For example but without limitation, the transmitter carrier phase timing 628/630 for each of the AM radio carrier signals 404/410 may be received via a cellular network 428 (FIG. 4), or may be embedded in each of the AM radio carrier signals 404/410.

The processor module 618 is configured to compute the satellite location estimate 510 (FIG. 5) of the receiving location 120 (FIG. 1) based on the measured code phase 612 of the satellite code phase 504. The processor module 618 is also configured to determine the integer number N (118/206/306 in FIG. 1) of the carrier wavelengths λ of the AM radio carrier signals 404/410 (FIG. 4) from the satellite location estimate 510 to each of the AM radio transmitters 406/412 (FIG. 4) respectively to resolve the integer cycle ambiguity. The processor module 618 is also configured to compute an improved position estimate 620 of the receiving location 120 based on the integer number N of carrier wavelengths λ and the measured carrier phase 636/638 of each of the AM radio carrier signals 404/410, and a transmitter location 424/426 (location 424/426) of each of the AM radio transmitters 406/412.

The transmitter location 424/426 of the AM radio transmitters 406/412 can be determined by, for example but without limitation, receiving the transmitter location 424/426 via the cellular network 428, accessing the transmitter location 424/426 of each of the AM radio transmitters 406/412 from an AM radio transmitter location database 626, or other location information resource.

The processor module 618, may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or other software or hardware machines.

A processor may also be implemented as a combination of computing devices, e.g., a combination of a digital signal processor and a microprocessor, a plurality of microprocessors, one or more microprocessors in conjunction with a digital signal processor core, or any other such configuration. The processor module 618 comprises processing logic that is configured to carry out the functions, techniques, and processing tasks associated with the operation of the system 600.

In particular, the processing logic is configured to support the method to resolve integer cycle ambiguities of a plurality of AM radio signals as described herein. Furthermore, the steps of a method or algorithm described in connection with the embodiments disclosed herein may be embodied directly in hardware, in firmware, in a software module executed by the processor module 618 or in any combination thereof.

The memory module 624, may be realized as a non-volatile storage device (non-volatile semiconductor memory, hard disk device, optical disk device, and the like), a random access storage device (for example, SRAM, DRAM), or any other form of storage medium known in the art. The memory module 624 may be coupled to the processor module 618 that can read information from, and write information to the memory module 624.

As an example, the processor module 618 and memory module 624 may reside in their respective ASICs. The memory module 624 may also be integrated into the processor module 618. In an embodiment, the memory module 624 may include a cache memory for storing temporary variables or other intermediate information during execution of instructions to be executed by the processor module 618. The memory module 624 may also include non-volatile memory for storing instructions to be executed by the processor module 618.

The memory module 624 may store, for example but without limitation, the integer component (N) 118/206/306, the factional component (P) 116, the distance 114/204/302, the carrier phase 402/408, the measured carrier phase 636/638, the potential navigation solutions 422, the satellite code phase 504, the satellite location estimate 510, the navigation solution 502, the measured code phase 612, the improved position estimate 620, and other parameters. The memory module 624 may also comprise the AM radio transmitter location database 626 for storing the transmitter location 424/426 of each of the AM radio transmitters 406/412.

Those skilled in the art will understand that the various illustrative blocks, modules, circuits, and processing logic described in connection with the embodiments disclosed herein may be implemented in hardware, computer-readable software, firmware, or other combination thereof. To clearly illustrate this interchangeability and compatibility of hardware, firmware, and software, various illustrative components, blocks, modules, circuits, and steps are described generally in terms of their functionality.

In some embodiments, the system 600 may comprise any number of processor modules, any number processing modules, any number of memory modules, any number of transmitter modules, and any number of receiver modules suitable for their operation described herein. The illustrated system 600 depicts a simple embodiment for ease of description. These and other elements of the system 600 are interconnected together, allowing communication between the various elements of system 600. In one embodiment, these and other elements of the system 600 may be interconnected together via a respective data communication bus 634.

A transmitter module and a receiver module may be located in the processor module 618 coupled to a shared antenna 632. Although in a simple module only one shared antenna 632 may be provided, more sophisticated modules may be provided with multiple and/or more complex antenna configurations. Additionally, although not shown in this FIG. 6, those skilled in the art will recognize that a transmitter may transmit to more than one receiver, and that multiple transmitters may transmit to a same receiver.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

FIG. 7 is an illustration of an exemplary flowchart showing a process 700 for calculating an integer number of carrier waves (integer cycle ambiguities (N)) according to an embodiment of the disclosure. The various tasks performed in connection with the process 700 may be performed by software, hardware, firmware, a computer-readable medium having computer executable instructions for performing the process method, or any combination thereof. The process 700 may be recorded in a non-transitory computer-readable medium such as a semiconductor memory, a magnetic disk, an optical disk, and the like, and can be accessed and executed, for example, by a computer CPU such as the processor module 608 in which the computer-readable medium is stored.

It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein. In some embodiments, portions of the process 700 may be performed by different elements of the system 600 such as: the satellite receiver 602, the medium wave radio receiver 614, the processor module 618, the memory module 624, etc. Process 700 may have functions, material, and structures that are similar to the embodiments shown in FIGS. 1-6. Therefore common features, functions, and elements may not be redundantly described here.

Process 700 may begin by receiving at least one satellite signal such as the satellite signal 604 at a satellite receiver such as the satellite receiver 602 at a receiving location such as the receiving location 120 (task 702).

Process 700 may continue by the satellite receiver 602 measuring a measured code phase such as the measured code phase 612 of the at least one satellite signal 604 at the satellite receiver 602 (task 704).

Process 700 may continue by computing a satellite location estimate such as the satellite location estimate 510 of the receiving location 120 based on the measured code phase 612 using a processor module such as the processor module 618 (task 706).

Process 700 may continue by receiving a plurality of medium wave radio carrier signals such as the AM radio carrier signals 404/410 from a plurality of medium wave radio transmitters such as the AM radio transmitters 406/412 with at least one medium wave radio receiver such as the medium wave radio receiver 614 at the receiving location 120 (task 708).

Process 700 may continue by determining a number of wavelengths such as the integer component (N) 118/206/306 of the medium wave radio carrier signals from the satellite location estimate 510 to each of the medium wave radio transmitters such as the AM radio transmitters 406/412 respectively using the processor module 618 (task 710).

Process 700 may continue by measuring a carrier phase such as the carrier phase 402/408 of each the medium wave radio carrier signals such as the AM radio carrier signals 404/410 with the at least one medium wave radio receiver 614 (task 712).

Process 700 may continue by computing an improved position estimate such as the improved position estimate 620 of the receiving location 120 based on the number of wavelengths such as the integer component (N) 118/206/306 and the carrier phase such as the measured carrier phase 636/638 of each of the medium wave radio carrier signals, and a location such as the transmitter location 424/426 of each of the medium wave radio transmitters using the processor module 618 (task 714).

Process 700 may continue by the medium wave radio receiver 614 receiving a transmitter carrier phase timing such as the transmitter carrier phase timing 628/630 for each of the medium wave radio carrier signals such as the AM radio carrier signals 404/410 (task 716).

Process 700 may continue by measuring a received carrier phase such as the received carrier phase 402/408 at the at least one medium wave radio receiver 614 (e.g., AM radio receiver) for each of the medium wave radio carrier signals (task 718).

Process 700 may continue by determining the carrier phase such as the measured carrier phase 636/638 of each the medium wave radio carrier signals such as the AM radio carrier signals 404/410 based on the transmitter carrier phase timing 628/630 and the received carrier phase 402/408 for each of the medium wave radio carrier signals such as the AM radio carrier signals 404/410 (task 720).

Process 700 may continue by receiving the transmitter carrier phase timing 628/630 for each of the medium wave radio carrier signals via a cellular network such as the cellular network 428 (task 722).

Process 700 may continue by receiving the location such as the transmitter location 424/426 of each of the medium wave radio transmitters via the cellular network 428 (task 724).

Process 700 may continue by accessing the location of each of the medium wave radio transmitters from a database such as the transmitter location database 626 (task 726).

In this manner, embodiments of the disclosure provide system and methods for resolving an integer cycle ambiguity of medium wave radio signals using a satellite-based-solution to determine an accurate location of a receiving location.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according the embodiments of the present disclosure.

In this document, the terms "computer program product", "computer-readable medium", and the like may be used generally to refer to media such as, for example, memory, storage devices, or storage unit. These and other forms of computer-readable media may be involved in storing one or more instructions for use by the processor module 618, perform specified operations. Such instructions, generally referred to as "computer program code" or "program code" (which may be grouped in the form of computer programs or other groupings), when executed, enable a method of using the system 600.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIG. 6 depicts example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A system for resolving integer cycle ambiguity in medium wave radio signals comprising:
   a satellite receiver operable to:
      receive at least one satellite signal at a receiving location; and
      measure a measured code phase of the at least one satellite signal;
   at least one medium wave radio receiver operable to:
      receive a plurality of medium wave radio carrier signals from a plurality of medium wave radio transmitters at the receiving location, wherein each of the medium wave radio carrier signals is an amplitude modulated radio carrier signal; and
      measure a plurality of carrier phases of the plurality of the medium wave radio carrier signals; and
   a processor module operable to:
      compute a satellite location estimate of the receiving location based on the measured code phase;
      determine one or more potential navigation solutions based on the plurality of carrier phases;
      determine a particular navigation solution of the one or more potential navigation solutions based on the satellite location of the receiving location;
      determine a number of wavelengths of the medium wave radio carrier signals from the particular navigation solution to each of the medium wave radio transmitters respectively; and
      compute a position estimate of the receiving location based on the number of wavelengths and the plurality of carrier phases.

2. The system of claim 1, wherein the satellite receiver comprises: an Iridium satellite-based receiver, a GNSS satellite receiver, or a combination thereof.

3. The system of claim 2, wherein the GNSS satellite receiver receives the at least one satellite signal from at least one member selected from the group consisting of: an LEO satellite, an MEO satellite, a GEO satellite, a Global Navigation Satellite System (GNSS) satellite, a Global Positioning System (GPS™) satellite, a Globalnaya Navigatsionnaya Sputnikovaya Sistema (GLONASS™) satellite, a BeiDou Navigation System (COMPASS™) satellite, and a Galileo™ satellite.

4. The system of claim 1, wherein the at least one medium wave radio receiver is further operable to:
   receive a transmitter carrier phase timing for each of the medium wave radio signals;
   measure a received carrier phase for each of the medium wave radio signals; and
   determine the carrier phase of each the medium wave radio signals based on the transmitter carrier phase timing and the received carrier phase for each of the medium wave radio signals.

5. The system of claim 4, wherein the transmitter carrier phase timing for each of the medium wave radio signals is embedded in each of the medium wave radio signals.

6. The system of claim 4, further comprising accessing the transmitter location of each of the medium wave radio transmitters from a database.

7. The system of claim 1, wherein each of the stationary medium wave radio transmitters is associated with a corresponding reference location, and wherein computing the position estimate comprises computing the position estimate based on the number of wavelengths, the plurality of carrier phases, and the reference locations of the medium wave radio transmitters.

8. The system of claim 7, wherein the reference locations of the reference locations of the medium wave radio transmitters comprise one or more of a location of a medium wave radio transmitter, a location of a differential reference station, and a location of a mobile reference receiver.

9. The system of claim 1, wherein a plurality of the potential navigation solutions comprises the one or more potential navigation solutions, and wherein determining the particular navigation solution comprises:
   determining a measurement residual for each potential navigation solution of the plurality of potential navigation solutions;
   determining a minimum measurement residual of the plurality of measurement residuals, wherein the minimum measurement residual is determined for a minimum potential navigation solution of the plurality of potential navigation solutions; and
   determining the particular navigation solution to be the minimum potential navigation solution.

10. A method for resolving integer cycle ambiguity in medium wave radio signals, the method comprising;
   receiving at least one satellite signal at a satellite receiver at a receiving location;
   measuring a measured code phase of the at least one satellite signal at the satellite receiver;

computing a satellite location estimate of the receiving location based on the measured code phase using a processor;

receiving a plurality of medium wave radio carrier signals from a plurality of medium wave radio transmitters with at least one medium wave radio receiver at the receiving location, wherein each of the medium wave radio carrier signals is an amplitude modulated radio carrier signal;

measuring a plurality of carrier phases of the plurality of the medium wave radio carrier signals with the at least one medium wave radio receiver;

determining one or more potential navigation solutions based on the plurality of carrier phases using the processor;

determining a particular navigation solution of the one or more potential navigation solutions based on the satellite location estimate of the receiving location using the processor;

determining a number of wavelengths of the medium wave radio carrier signals from the particular navigation solution to each of the medium wave radio transmitters respectively using the processor;

computing a position estimate of the receiving location based on the number of wavelengths and the plurality of carrier phases.

11. The method of claim 10, further comprising:

receiving a transmitter carrier phase timing for each of the medium wave radio signals;

measuring a received carrier phase at the at least one medium wave radio receiver for each of the medium wave radio signals; and determining the carrier phase of each the medium wave radio signals based on the transmitter carrier phase timing and the received carrier phase for each of the medium wave radio signals.

12. The method of claim 11, wherein the transmitter carrier phase timing for each of the medium wave radio signals is embedded in each of the medium wave radio signals.

13. The method of claim 11, further comprising accessing the location of each of the medium wave radio transmitters from a database.

14. The method of claim 10, wherein the at least one satellite signal comprises: a Low Earth Orbiting (LEO) satellite signal, an Iridium satellite-based signal, a GNSS signal, or a combination thereof.

15. The method of claim 14, wherein the GNSS signal is transmitted from at least one member selected from the group consisting of: an LEO satellite, an MEO satellite, a GEO satellite, a Global Navigation Satellite System (GNSS) satellite, a Global Positioning System (GPS™) satellite, a Globalnaya Navigatsionnaya Sputnikovaya Sistema (GLONASS™) satellite, a BeiDou Navigation System (COMPASS™) satellite, and a Galileo™ satellite.

16. The method of claim 10, wherein each of the stationary medium wave radio transmitters is associated with a corresponding reference location, wherein computing the position estimate comprises computing the position estimate based on the number of wavelengths, the plurality of carrier phases, and the reference locations of the medium wave radio transmitters, and wherein the reference locations of the reference locations of the medium wave radio transmitters comprise one or more of a location of a medium wave radio transmitter, a location of a differential reference station, and a location of a mobile reference receiver.

17. The method of claim 10, wherein a plurality of the potential navigation solutions comprises the one or more potential navigation solutions, and wherein determining the particular navigation solution comprises:

determining a measurement residual for each potential navigation solution of the plurality of potential navigation solutions;

determining a minimum measurement residual of the plurality of measurement residuals, wherein the minimum measurement residual is determined for a minimum potential navigation solution of the plurality of potential navigation solutions; and determining the particular navigation solution to be the minimum potential navigation solution.

18. A non-transitory computer readable storage medium comprising computer-executable instructions for resolving integer cycle ambiguities in medium wave radio signals, the computer-executable instructions comprising:

receiving at least one satellite signal at a satellite receiver at a receiving location;

measuring a measured code phase of the at least one satellite signal at the satellite receiver;

computing a satellite location estimate of the receiving location based on the measured code phase using a processor module;

receiving a plurality of medium wave radio carrier signals from a plurality of medium wave radio transmitters with at least one medium wave radio receiver at the receiving location, wherein each of the medium wave radio carrier signals is an amplitude modulated radio carrier signal;

measuring a plurality of carrier phases of the plurality of the medium wave radio carrier signals with the at least one medium wave radio receiver;

determining one or more potential navigation solutions based on the plurality of carrier phases using the processor module;

determine a particular navigation solution of the one or more potential navigation solutions based on the satellite location estimate of the receiving location using the processor module;

determining a number of wavelengths of the medium wave radio carrier signals from the particular navigation solution to each of the medium wave radio transmitters respectively using the processor module;

computing position estimate of the receiving location based on the number of wavelengths and the plurality of carrier phases using the processor module.

19. The non-transitory computer readable storage medium of claim 18, further comprising computer-executable instructions for:

receiving a transmitter carrier phase timing for each of the medium wave radio carrier signals;

measuring a received carrier phase at the at least one medium wave radio receiver for each of the medium wave radio carrier signals; and determining the carrier phase of each the medium wave radio carrier signals based on the transmitter carrier phase timing and the received carrier phase for each of the medium wave radio carrier signals.

20. The non-transitory computer readable storage medium of claim 19, further comprising computer-executable instructions for receiving the at least one satellite signal from: an Iridium satellite, a GNSS satellite, or a combination thereof.

\* \* \* \* \*